United States Patent [19]

Kaneko

[11] Patent Number: 5,363,565
[45] Date of Patent: Nov. 15, 1994

[54] FISHING LINE LENGTH MEASURING DEVICE FOR FISHING REELS

[75] Inventor: Kyoichi Kaneko, Tokyo, Japan
[73] Assignee: Daiwa Seiko, Inc., Tokyo, Japan
[21] Appl. No.: 63,405
[22] Filed: May 18, 1993
[30] Foreign Application Priority Data May 18, 1992 [JP] Japan .................. 4-124861

[51] Int. Cl.⁵ ............................ A01K 89/00
[52] U.S. Cl. ...................... 33/719; 33/716; 33/763; 242/395
[58] Field of Search ........... 33/735, 736, 739, 732, 33/733, 715, 719, 754, 756, 780, 745, 716, 762, 763; 364/561, 571.02, 571.04; 242/84.8

[56] References Cited

U.S. PATENT DOCUMENTS 4,697,758 10/1987 Hirose et al. ............. 33/716 X
4,790,492 12/1988 Atobe ...................... 33/762 X

FOREIGN PATENT DOCUMENTS 0099812 5/1986 Japan ....................... 33/735
0099813 5/1986 Japan ....................... 33/735
0276011 11/1989 Japan ....................... 33/735
0838312 6/1981 U.S.S.R. ................... 33/756

Primary Examiner—William A. Cuchlinski, Jr.
Assistant Examiner—Alvin Wirthlin
Attorney, Agent, or Firm—Kalish & Gilster

[57] ABSTRACT

A fishing line length measuring device to determine the let out or wound up amount of the fishing line based on the number of spool revolutions. The device has a reel, a spool rotatably supported by the reel where the fishing line is wound up, a sensor to detect the revolutions of the spool, an up/down counter to count up or down the pulse signals output from the sensor, a storage means which receives and holds the count values obtained at the up/down counter when the counter counts actual number of spool revolutions during winding or unwinding the fishing line for specified lengths from a certain reference point set on the fishing line, an operation means to determine the line length using the line length formula obtained corresponding to the numbers of spool revolutions for the specified lengths and these actual numbers of revolutions, and an indication unit to indicate the line length determined by the operation means.

7 Claims, 12 Drawing Sheets

FISHING LINE LENGTH MEASURING DEVICE FOR FISHING REELS

BACKGROUND OF THE INVENTION

1. Field of the Invention

The present invention relates to a fishing line length measuring device for fishing reels and particularly to a fishing line length measuring device for determination of the amount unwound or the amount wound of the fishing line based on the number of spool revolutions.

2. Description of the Art

Recent fishing reels are often capable of determining the unwound or wound length of the fishing line, which enables the exact setting of fishing devices at the shelf where there are plenty of fish and a display of the distance to the fishing device point when casting the bait.

The inventor of the present invention has already proposed a fishing line measuring device for fishing reels capable of highly precise measurement of the unwound or wound length of the fishing line regardless of the line diameter in the Japanese Patent Application Laid-open No. 276011/1989.

The above fishing line measuring device uses a determined constant corresponding to the spool shape together with the total number of spool revolutions when the fishing line is wound to the specified wound line diameter level and the actual number of spool revolutions during unwinding or winding of the fishing line to obtain the fishing line length with the formula (1) below.

FIG. 19 shows a specific example explaining the relation between the number of revolutions made by the spool 1 where the spool 1 is of straight type with invariable winding width m', the outer diameter of the fishing line 3 wound onto the spool 1 and the line length. Symbols in the figure have the meanings as follows:

- $d_1$: Wound line diameter of the fishing line 3 at the specified wound line diameter level 5;
- $d_0$: Bottom diameter of the spool 1;
- $d_m$: Outer diameter of the wound line changed by unwinding or winding of the fishing line 3; and
- h: Groove depth of the spool 1 up to the specified wound line diameter level 5

The conventional embodiment above uses as the basic data the total number of revolutions n of the spool 1 when the fishing line 3 is wound up to the specified wound line diameter level 5 and the actual number of spool 1 revolutions na when the wound line diameter changes from $d_1$ to $d_m$ by revolutions of the spool 1 to perform the following formula stored in the ROM of the microcomputer:

$$L' = (a/n)(na)^2 + b(na) \tag{1}$$

where n is the total number of the spool 1 revolutions when the fishing line 3 is wound up to the specified wound line diameter level 5, na is the actual number of revolutions made by the spool 1 in letting out or winding up of the fishing line 3, a is the constant for h and b is the constant for $d_1$.

Thus, the let out line length L' corresponding to the actual number of revolutions na made by the spool 1 is determined.

The total number of revolutions n and the actual number of revolutions na at the spool 1 are respectively counted by an up-down counter and the counted values are stored in the RAM of the microcomputer.

For the conventional line length measuring device above, however, it is inconvenient to determine the constant for the unwound line amount when actually fishing. Specifically, the wound line diameter d1, which is substantially the same as the maximum winding diameter of the spool 1, is used as the specified wound line diameter level 5, and the total number of revolutions n made by the spool 1 up to the specified wound diameter level 5 is input to the RAM as the total line length of the fishing line 3. Since the specified wound line diameter level 5 is used as the base of the let out line diameter, the user must wind up the fishing line 3 up to the specified wound line diameter level 5 once to input the total number of revolutions n made by the spool 1 as the basic data. It was bothersome to wind up the fishing line 3.

Besides, when the wound line diameter of the fishing line 3 wound onto the spool 1 is below the specified wound line diameter level 5 set near the maximum wound line diameter of the spool 1, the basic data cannot be input which disables operation of the formula (1); if the fishing line 3 has a length resulting in a wound line diameter exceeding the specified wound line diameter level 5, then the basic data cannot be input for the amount exceeding the specified wound diameter level 5.

Thus, the above line length measuring device has drawbacks that the fishing line 3 must be wound up to the specified wound diameter level 5 once and that the line length cannot be determined when the wound line diameter of the fishing line 3 is more or less than the specified wound diameter level 5. To have the line length measuring device work, the user has to add unnecessary fishing line just to make the line reach the specified wound line diameter level 5 or cut the excessive part over the specified wound line diameter level 5.

Besides, to precisely check whether the fishing line 3 is wound up to the specified wound diameter level 5, an input scale for specified line winding detector according to the Utility Model Laid-open No. 9566/1992 disclosed by the inventor of the present invention is separately needed. Thus, checking is bothersome and the operability is not good.

In addition, though fishermen tend to use a base line with a diameter different from the fishing line 3 in actual fishing, the conventional line length measuring device as above uses the number of revolutions n made by the spool 5 up to the specified wound diameter level 5 as the basic data for line length measurement, and it is impossible to input the basic data when the base line is used.

SUMMARY OF THE INVENTION

The present invention has been made to solve the problems as described above. It is an object of the present invention to provide a fishing line length measuring device for fishing reels which enables easy input of basic data whether a base line is used or not and regardless of the diameter or length of the fishing line and ensures proper line length measurement.

According to a preferred embodiment of the present invention to attain the above object, a fishing line length measuring device for fishing reels comprises a reel, a spool rotatably supported by the reel where the fishing line is wound up, a sensor to detect the revolutions of the spool, an up/down counter to count up or down the pulse signals output from the sensor, a storage means which receives and holds the count values obtained at the up/down counter when the counter counts actual number of spool revolutions during winding up or letting out of the fishing line for a plurality of specified lengths from a certain reference point set on the fishing line, an operation means to determine the line length using the line length formula obtained corresponding to the numbers of spool revolutions for the specified lengths and these actual numbers of revolutions, and an indication unit to indicate the line length determined by the operation means.

According to the present invention, the actual numbers of spool revolutions during winding or unwinding of the fishing line from the reference point up to the applicable specified length is counted by the up/down counter. Based on such counted values, the line length formula is operated and the line length is indicated at the indication unit.

The present invention allows line length measurement under various situations with enabling data input regardless of the length or diameter of the fishing line and even when a base line is used.

In addition, the present invention eliminates the need of an input scale used with the conventional device, which simplifies the data input procedure. Thus, without any limitation on the line type, the present fishing line length measuring device acquires a higher practicability than conventional devices.

DESCRIPTION OF THE PREFERRED EMBODIMENT OF THE INVENTION

Preferred embodiments of the present invention will be described in detail below with referring to the attached figures.

FIGS. 1 to 10 are for a first embodiment of the present invention.

Figure 1:
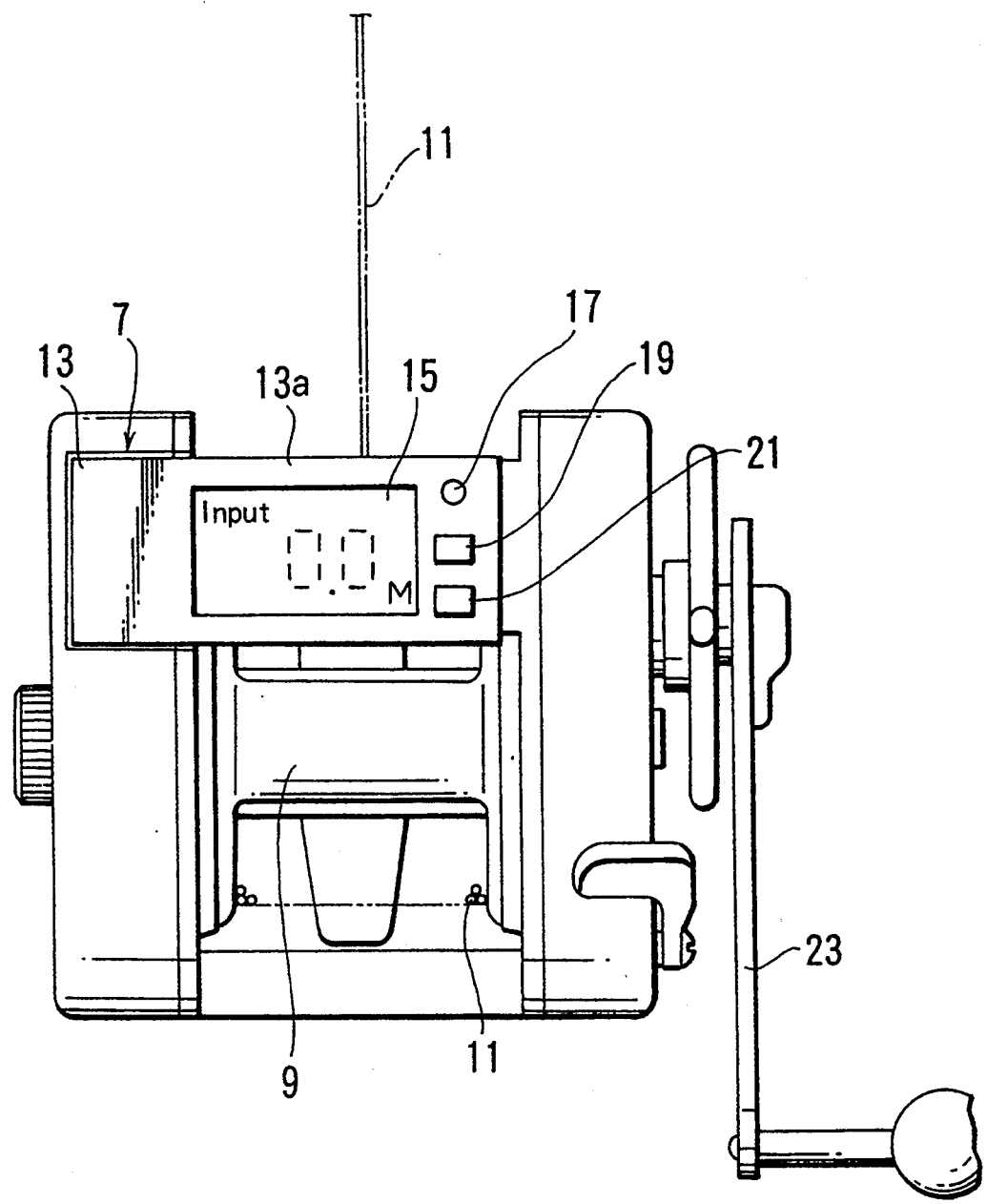
FIG. 1 is a plan view of a fishing reel provided with a line length measuring device according to an embodiment of the present invention.

In FIG. 1, the reference numeral 7 indicates a reel and 9 indicates a spool rotatably mounted to the reel 7, and a fishing line 11 is wound onto the spool 9.

A fishing line of a bobbin is usually 100 meters long. The fishing line 11 in this embodiment is also 100 meters long, and dyed with five colors with one color lasting for 10 meters. The fishing line 11 has two 50-meter sections each of which has one cycle of five colors. In addition, the fishing line 11 uses a base line.

The reference numeral 13 is a flat water-proof box uniformly mounted onto the top face of the reel 1. The box 13 has an upper panel 13a provided with an indication unit 15, a mode switch 17, an input switch 19 and a set switch 21.

The box 13 is water-tight and also accommodates a microcomputer for line length operation and a battery power source (both will be described later). The numeral 23 indicates a handle to rotate the spool 9.

Figure 2:
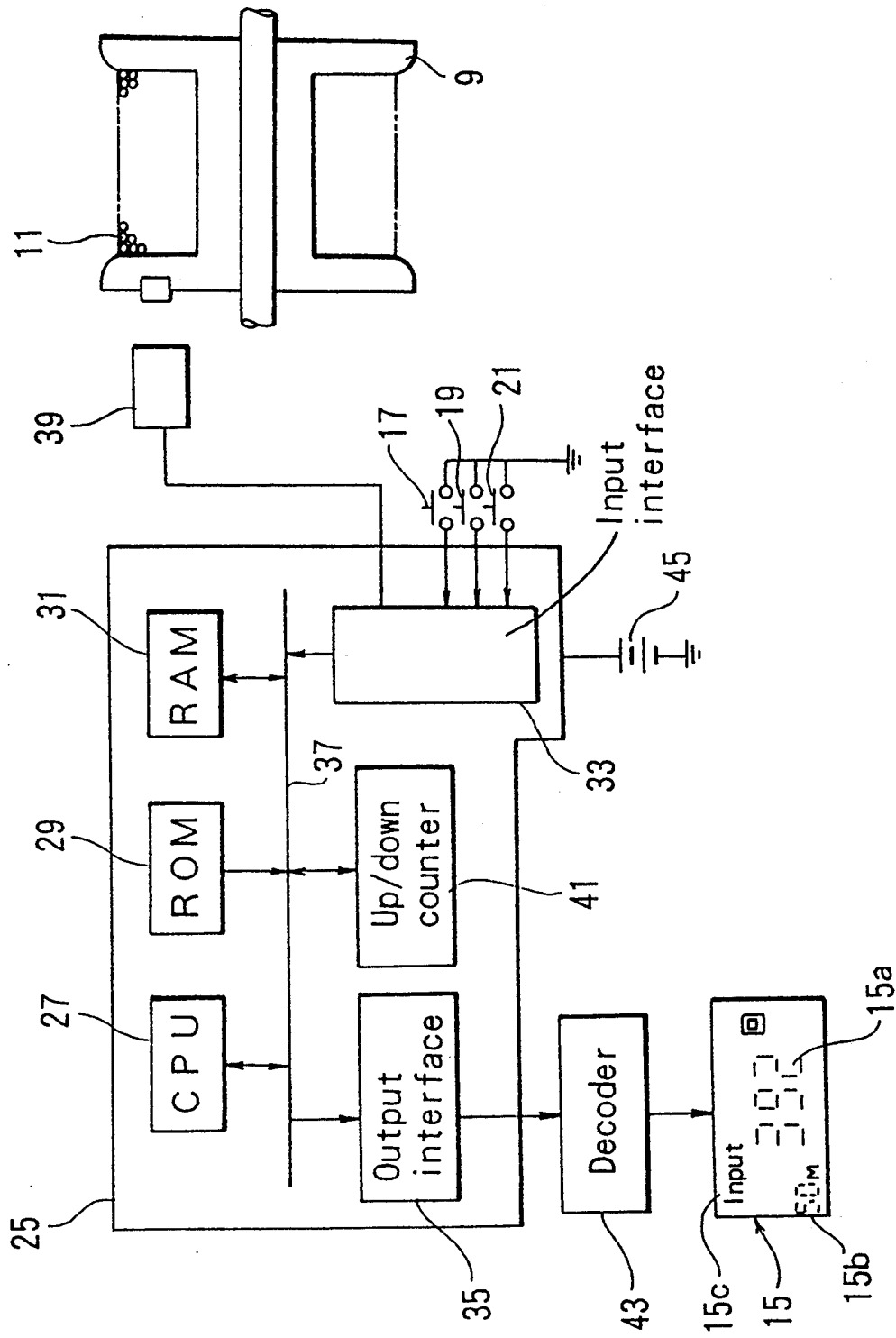
FIG. 2 is a diagram to show the entire configuration of a line length measuring device according to the present invention.

FIG. 2 shows the entire configuration of a line length measuring device according to this embodiment.

In the figure, the reference numeral 25 is a microcomputer which controls the line length operation and data writing.

The microcomputer 25 is provided with a central processing unit (CPU) 27 which controls a program memory, a data memory and input/output devices to perform operations and transfers needed for a given job, a ROM 29 which stores the operation program and the line length formula (2) (to be described later), RAM 31 which stores the data such as operation results from the CPU 27, an input interface 33 and an output interface 35. The ROM 29, the RAM 31 and the interfaces 33 and 35 are connected to the CPU 27 via a bus 37.

In the figure, the reference numeral 39 is a sensor to detect revolutions and revolution direction of the spool 9. The sensor 39 is connected with the input interface 33 of the microcomputer 25. The signal judging the revolution direction of the spool 9 (forward or backward) output from the sensor 39 is sent to the CPU 27 via an input interface 33 and sets an incorporated up/down counter 41 to the increment or decrement status, so that the up/down counter 41 counts up or down the revolution pulse signals for the spool 9 sent from the sensor 39 via the input interface 33.

Besides, the above input interface 33 is connected with the mode switch 17, the input switch 19 and the set switch 21. The mode switch 17 serves for switching the microcomputer 25 among the data input mode, line length indication mode and data correction mode.

To the above output interface 35, an indication unit 15 is connected via a decoder 43. The indication unit 15 is provided with an indicator 15a for digital indication of the line length (in line length indication mode) or the number of spool 1 revolutions (in data input mode), a specified length indicator 15b used in data input mode, and an indicator 15c for indication of the current mode. In addition, in the figure, the reference numeral 45 is the battery power source for the microcomputer 25 and the indication unit 15.

Figure 3:
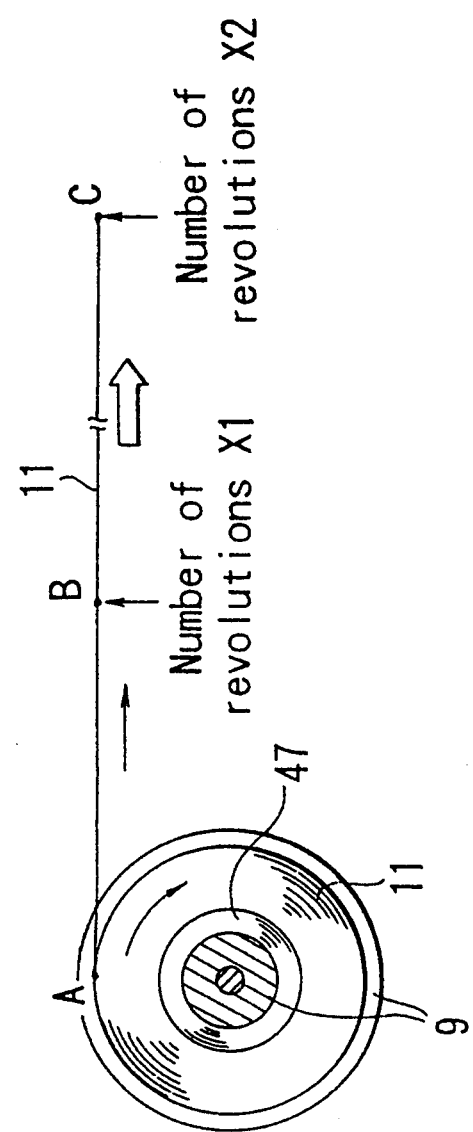
FIG. 3 is an explanatory view to illustrate the relation between the reference point and the specified length when the fishing line is unwound from the reference point for the specified length.

In this embodiment, reference numbers of revolutions X1 and X2 as in FIG. 3 are input first. When the fishing line 11 using the base line 47 is fully wound up onto the spool 9, the end of the fishing line 11 is considered as the reference point A. The user lets out the predetermined specified length of 10 meters (from the point B to the point A in the figure) from the reference point A with checking the color of the fishing line 11. Then, the actual number of revolutions X1 of the spool 9 for the specified length 10 meters is input. Next, the fishing line 11 is further let out for 20 meters. The actual number of revolutions X2 of the spool 9 for the specified length of 30 meters (from the point A to C in the figure) is now input. Then, the line length formula stored in the ROM 29 as shown below is applied.

$$Y = aX^2 + bX \quad (2)$$

where
Y: line length
X: number of revolutions made by spool 1 and
a, b: constants for each fishing line The above constants a and b are determined as basic data, and using the line length formula (2) where these constants a and b are applied, the line length Y corresponding to the number of revolutions X made by the spool 9 is determined.

The actual numbers of revolutions X1 and X2 made by the spool 9 when the fishing line 11 is let out for the specified lengths (10 meters and 30 meters) are counted by the above up/down counter 41 and the count values are stored in the RAM 31.

Figure 4:
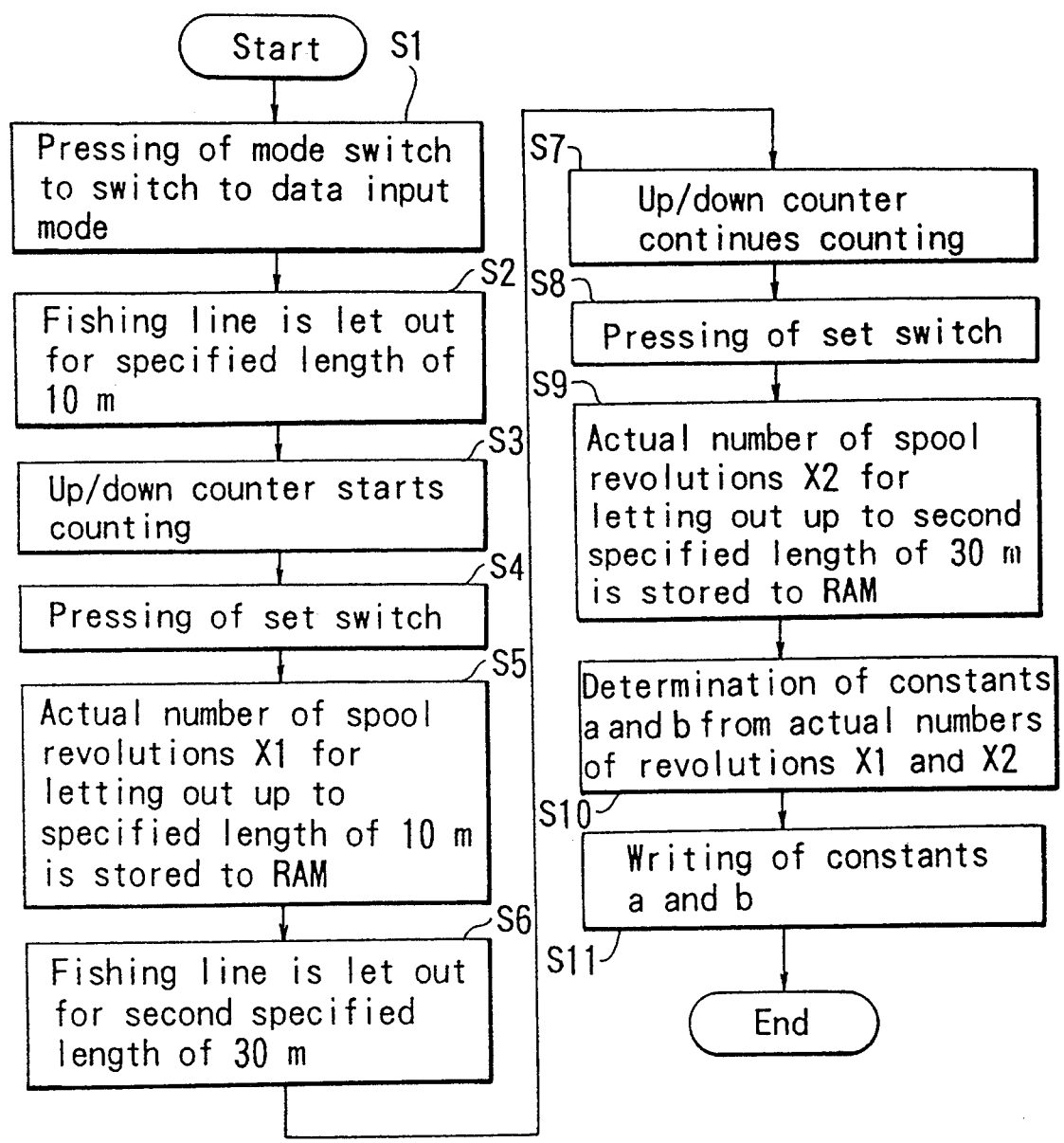
FIG. 4 is a flowchart to illustrate the data input procedure in a first embodiment.

Input of the actual number of revolutions X1 and X2 made by the spool 9 when the fishing line 11 is let out from the above reference point A for each specified length is now described referring to the flowchart in FIG. 4.

First of all, an end of the base line 47 connected to the fishing line 11 is tied to the bottom diameter of the spool 9. The handle 23 is rotated so as to cause the spool 9 to make revolutions and wind up the fishing line 3 onto the spool 9 entirely. At the same time as the revolutions of the spool 9, a line guide in a level winder mechanism (not shown) traverses the spool in the width direction and the fishing line 11 is wound onto the spool 9 with a uniform winding level and with a uniform density.

Then, the battery power source 45 is connected and the microcomputer 25 is initialized and becomes ready for operation.

Figure 5:
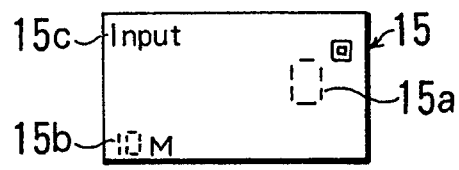
FIG. 5 is an explanatory view to show the indication at the indication unit when the data input is started.

Now, upon pressing of the mode switch 17 (Step S1), the microcomputer 25 enters the data input mode. The indicating unit 15 has its indicator 15a digitally display the value "038 as the initial value of the number of spool revolutions as shown in FIG. 5. It has its indicator 15b display "10 M" as the specified length stored in the ROM 29 in advance, and the indicator 14c indicate "input" to show that the system is in data input mode.

Figure 6:
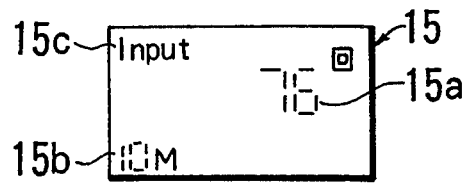
FIG. 6 is an explanatory view to show the indication at the indication unit when the fishing line has been unwound for the specified length.
Figure 7:
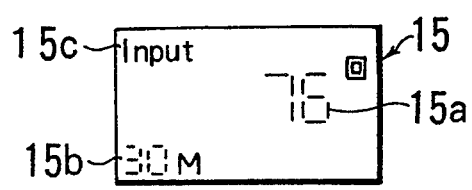
FIG. 7 is an explanatory view to show the indication at the indication unit when the actual number of spool revolutions up to the specified length is input.
Figure 8:
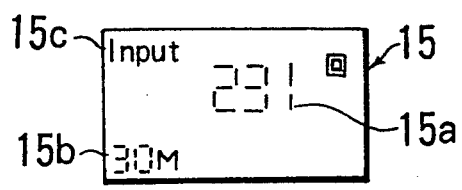
FIG. 8 is an explanatory view to show the indication at the indication unit when the fishing line is unwound for the second specified length.

Next, when the fishing line 11 is let out for 10 meters (specified length) from the reference point A based on the color given to the fishing line 11 (Step S2), the spool 9 makes revolutions causing a pulse signal for a revolution of the spool 9 to be output from the sensor 39, which the up/down counter 41 receives via the input interface 33 to count up or down the number of revolutions made by the spool 9 (Step S3). Then, when the specified length (10 meters) is completely let out, the actual number of revolutions X1 (X1=76) of the spool 9 is displayed at the indicator 15a as shown in FIG. 6,.

Upon pressing of the set switch 21 now (Step S4), the count (X1=76) at the up/down counter 41 is stored to the RAM 31 as the actual number of revolutions X1 made by the spool 9 until the line is let out for 10 meters (Step S5). By applying this actual number of revolutions X1 to the above line length formula (2), the following equation can be obtained:

$$10 = (76)^2(a) + (76)(b) \quad (3)$$

After that, with referring to the color on the fishing line 11, it is further let out for 20 meters so that the specified length of 30 meters is let out from the reference point A (Step S6). Note that, when the set switch 21 is pressed for storage of the actual number of revolutions X1 to the RAM 31 as described above, the indicating unit 15 has the indicator 15b display "30 m" as the second specified length.

Thus, as the fishing line 11 is let out, the pulse signal generated for each revolution of the spool 9 is sent to the up/down counter 41 via the input interface 33, and the number of spool revolutions is continuously counted (Step S7). When the fishing line 11 has been let out for the specified length of 30 meters from the reference point A, the number of actual revolutions X2 (X2=231) made by the spool 9 is displayed at the indicator 15a.

When the set switch 21 is pressed (Step S8), then the count value at the up/down counter 41 (X2=231) is stored to the RAM 31 as the actual number of revolutions made by the spool 9 until the specified length of 30 meters (Step S9). By substituting the above formula (2) and the actual number of revolutions X2, the following equation can be obtained:

$$30 = (231)^2(a) + (231)(b) \quad (4)$$

The CPU 27 uses the above formulae (3) and (4) to determine the constants as follows (Step S10):
a = 1.1 × 10$^{-5}$
b = 0.1324

By applying the constants a and b to the formula (2), Y can be determined as follows:

$$Y = (1.1)(10^{-5})X^2 + (0.1324)X \quad (5)$$

Thus, the constants a and b for the formula (2) are given as the basic data for the fishing line 11 (Step S11).

Referring now to the flowchart of FIG. 9, the line length measurement is described below.

Figure 9:
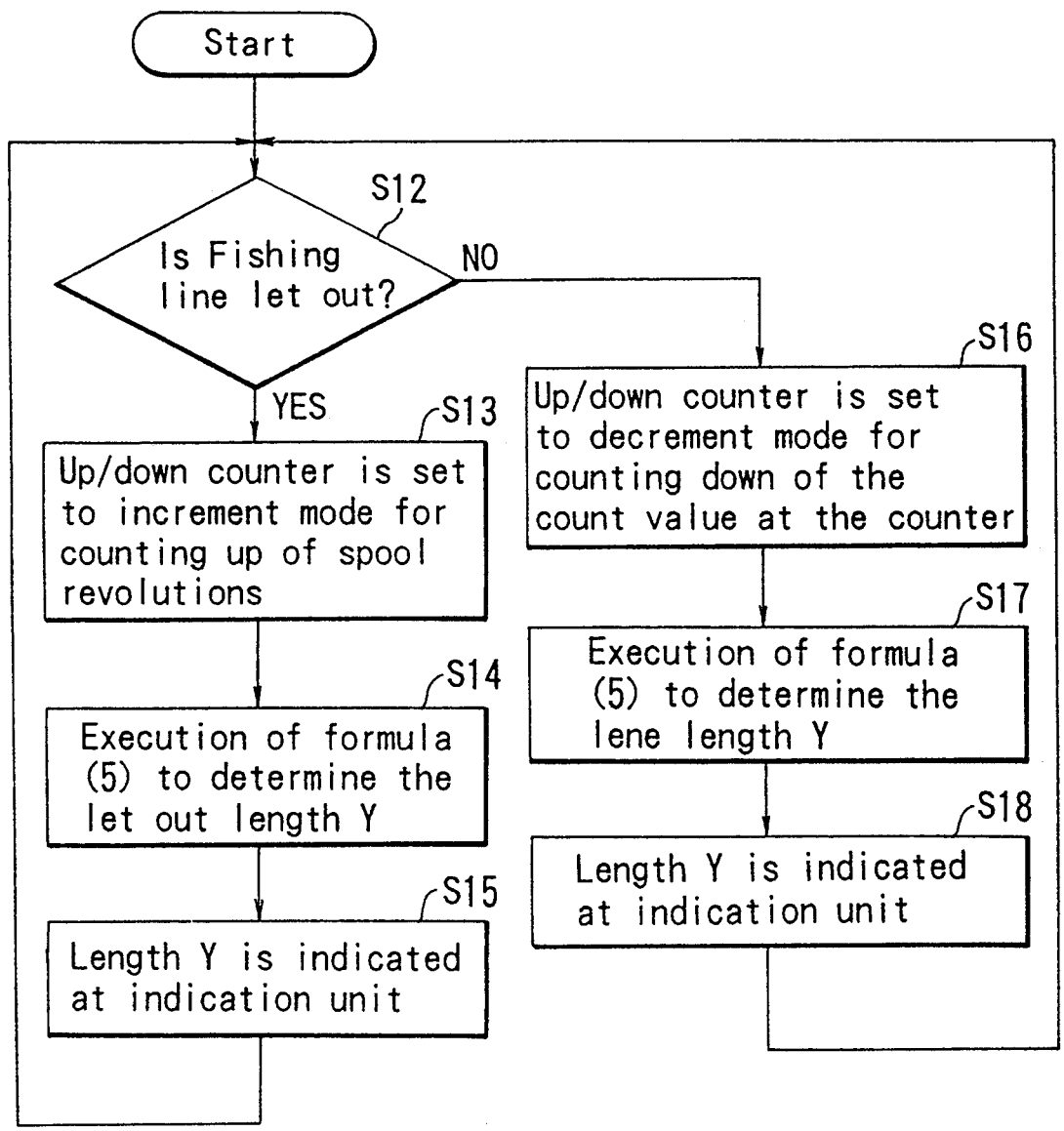
FIG. 9 is a flowchart to illustrate the procedure of line length measurement indication.

When the mode switch 17 is pressed for line length display mode, the program of FIG. 9 starts. It first judges whether the fishing line 11 is being let out or not in Step S12.

If it is judged that the fishing line 11 is being let out, it means that the spool 9 rotates in forward direction as the fishing line 11 is let out. The sensor 39 sends the forward direction signal to the CPU 27 via the input interface 33, which sets the up/down counter 41 to the increment mode. As the spool 9 makes revolutions, the pulse signal output from the sensor 39 for every revolution by the spool 9 is sent to the up/down counter 41 via the input interface 33, which subsequently makes counting up (Step S13).

In the next step S14, the count value X at the up/down counter 41 is sent to the CPU 27 for every operation cycle of the microcomputer 25 so that operation of the above formula (5) can be executed. The result of this operation is output to the indication unit 15 via the output interface 35 and the decoder 43. Thus, the let out length Y of the fishing line 11 is digitally indicated at the indicator 15a (Step S15).

If, in the step S12, it is judged that the fishing line 11 is being wound up, it means that the spool 9 rotates in backward direction as the fishing line 11 is wound up. In this case, the sensor 39 sends the backward direction signal to the CPU 27 via the input interface 33, which sets the up/down counter 41 to the decrement mode. As the spool 9 rotates in backward direction, the pulse signal output from the sensor 39 is sent to the up/down counter 41, which counts down from the count value obtained in letting out (Step S16).

In the next step S17, the count X at the up/down counter 41 is received by the CPU 27 for every operation cycle of the microcomputer 25. The CPU 27 operates the formula (5) to determine the length Y, which is specifically obtained by deducting the wound line length from the let out line length. The CPU 27 outputs the length Y to the indication unit 15 and digitally have the line length L displayed at the indicator 15a (Step S18).

Figure 10:
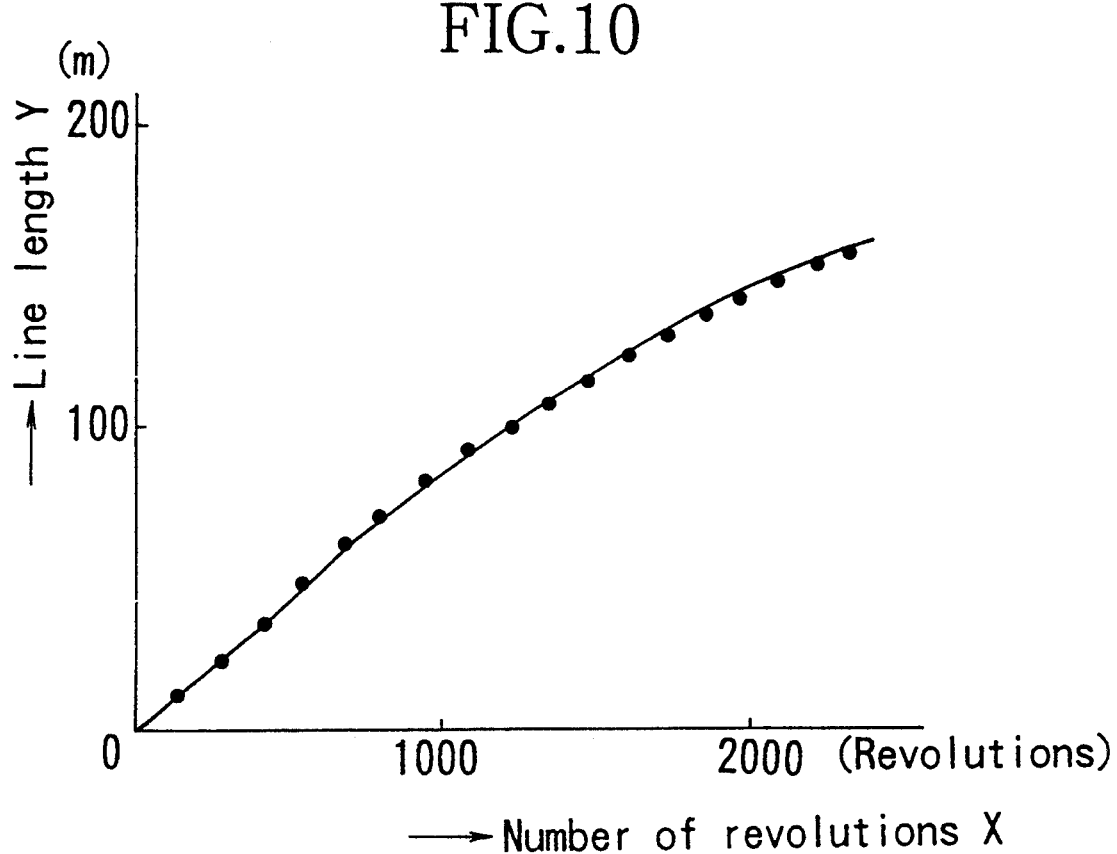
FIG. 10 is a graph to show the relation between the line length and the number of spool revolutions.

FIG. 10 shows the relation between the number of revolutions X made by the spool 9 and the line length Y. Calculated results of the line length formula (5) are shown in the solid line and the actually measured values are as shown in black dots. As clearly understood from the graph, discrepancies between the calculated values and the actually measured values are quite small.

Thus, according to this embodiment, as in the case of the line length measuring device disclosed in the Japanese Patent Application Laid-open No. 276011/1989, the unwound line length and the wound line length can be measured in high precision regardless of the diameter of the fishing line 11. In addition, the present invention has the advantages below.

Figure 19:
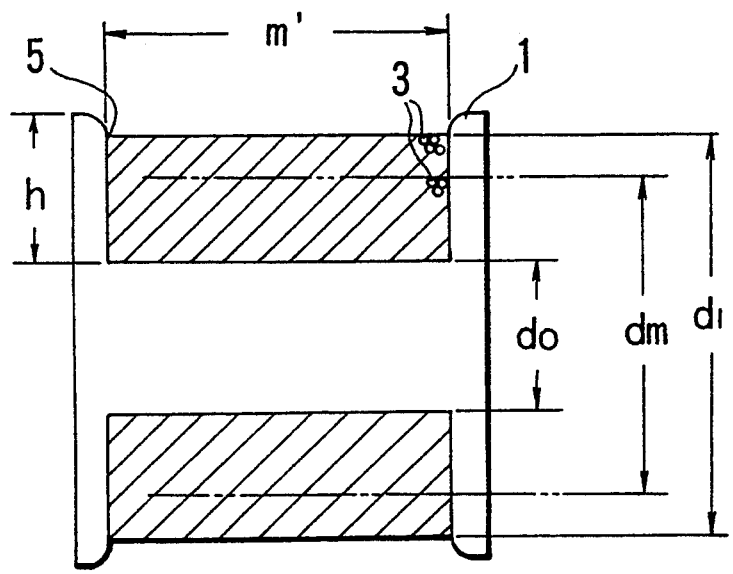
FIG. 19 is an explanatory view of the spool in a conventional line length measuring device.

As already described with referring to FIG. 19, a conventional line length measuring device requires input of the total number of revolutions n made by the spool 1 up to the specified wound line diameter level 5 set at the wound line diameter $d_1$, which is substantially the same as the maximum wound line diameter of the spool 1 as the total line length of the fishing line 3 and uses the specified wound line diameter level 5 as the base diameter dm for letting out. This means that the fishing line 11 must be once wound up to the specified wound line diameter level 5 and it is bothersome.

Besides, the conventional device cannot measure the line length when the wound line diameter of the fishing line 3 is over or below the specified wound line diameter level 5, and the user is forced to add unnecessary fishing line to have the wound line diameter reach the specified wound line diameter level 5 or cut the excessive part of the fishing line 3 over the specified wound diameter level 5.

The device also requires a separate input scale to exactly check that the fishing line 3 is wound up to the specified wound line diameter level 5. Checking is troublesome and the device has only a poor operability.

In addition, since the above line length measuring device uses the number of revolutions n of the spool 1 up to the specified wound line diameter level 5 as the basic data for line length measurement, it is impossible to input the basic data if the base line is used.

In contrast, this embodiment allows for use of a base line. After winding up of the spool 9 of the fishing line 11 using the base line 47, the reference point A is set at an end of the fishing line. Then, the actual number of revolutions X1 made by the spool 9 for the specified length of 10 meters is input when the predetermined specified length of 10 meters has been let out from the reference point A with checking the length by the color given to the fishing line 11. After that, another actual number of revolutions X2 made by the spool 9 for the length of 30 meters from the reference point A is input after letting out of the fishing line 11 for 20 meters more. Now, the constants a and b in the formula (2) stored in the ROM 29 of the microcomputer 25 are determined as the basic data, and based on the formula (5) with these constants a and b applied to, the line length Y corresponding to the number of revolutions X made by the spool 9 is determined. According to this embodiment, line length can be determined regardless of the length and thickness of the fishing line 11 and use of the base line 47.

In addition, this embodiment without the specified wound line diameter level 5 in the conventional device eliminates the need of winding up of the fishing line 11 to the specified wound line diameter level 5 using the input scale. The user can just wind up the fishing line 11 having the length really required onto the spool 9. Besides, this embodiment realizes specified length measurement with using the color given to the fishing line 11 and the data can be input with simple operation using the input switch 19 and the set switch 21. The device can now cope with any kind of line without any limitation for the line type, which results in a higher practicability than the conventional line length measuring device.

In the first embodiment described above, the fishing line 11 is let out from the reference point A for the first specified length of 10 meters (From A to B in the figure) and the second specified length of 30 meters (From A to C in the figure) and the actual number of revolutions X1 and X2 made by the spool 9 are input so that the constants in the formula (2) corresponding to the fishing line 11 are determined. However, as in the second embodiment as shown in FIGS. 11 to 16, the constants a and b can be calculated during winding up of the fishing line 11 from the bobbin to the spool 9.

Referring now to FIGS. 11 to 16, a second embodiment of the present invention is described. The components serving in the same way as in the first embodiment are given, the same numerals and the description about them is omitted.

Figure 11:
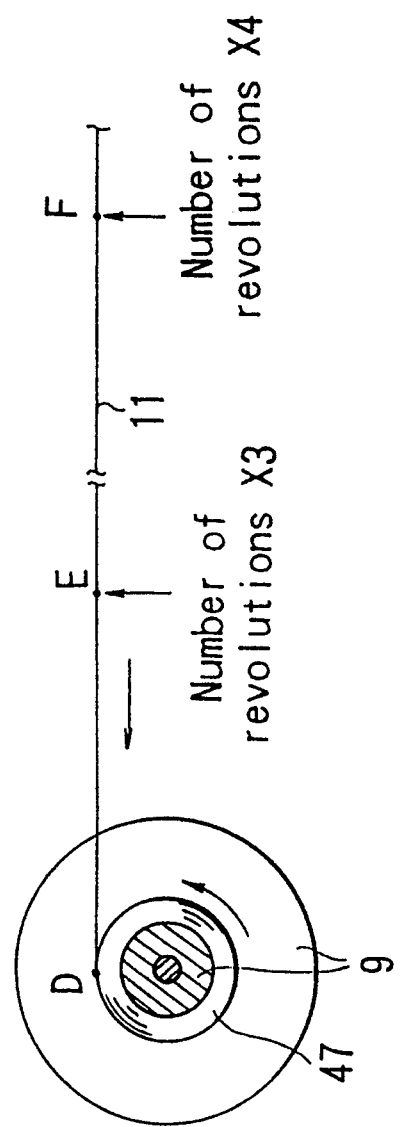
FIG. 11 is an explanatory view to show the relation between the reference point and the specified length when the fishing line is wound up from the reference point for the specified length.

In the second embodiment, when the base line 47 is wound onto the spool 9 as in FIG. 11, the starting end of the fishing line 11 wound onto a bobbin is considered to be the reference point D. First of all, the first specified length of 10 meters set in advance (From D to E in the figure) is wound up from the reference point D with checking the color of the fishing line 11 so as to input the actual number of revolutions X3 made by the spool 9 for the specified length of 10 meters. Then, the fishing line 11 is further wound up for 20 meters and the actual number of revolutions X4 made by the spool 9 for the length of 30 meters from the reference point D (From D to F in the figure) is input. Then, the constants a and b corresponding to the fishing line 11 are determined as the basic data for the above formula (2) stored in the ROM 29 in the microcomputer 25. Based on the formula (2) where the constants a and b are applied, the line length Y corresponding to the number of revolutions X of the spool 9 can be determined.

Figure 12:
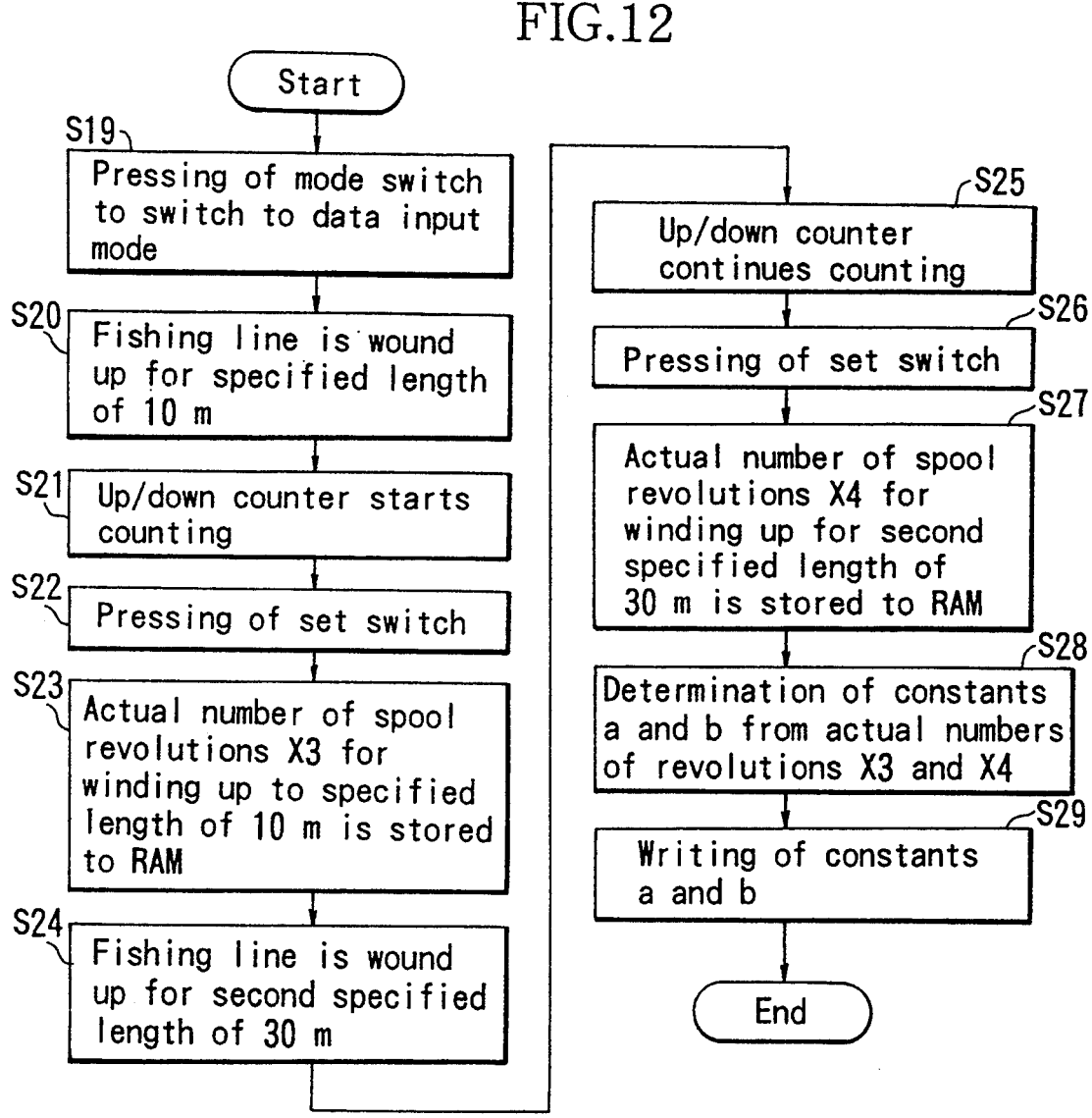
FIG. 12 is a flowchart to illustrate the data input procedure in a second embodiment.

Referring now to the flowchart of FIG. 12, input of the actual numbers of revolutions X3 and X4 of the spool 9 when the fishing line 11 is wound up for each specified length from the reference point D is described.

Firstly, an end of the base line 47 is tied to the bottom diameter of the spool 9. The handle 23 is rotated so that the base line 47 is entirely wound up onto the spool 9.

Then, as in the first embodiment, the battery power source 45 is connected and the microcomputer 25 is initialized and becomes ready for operation.

Figure 13:
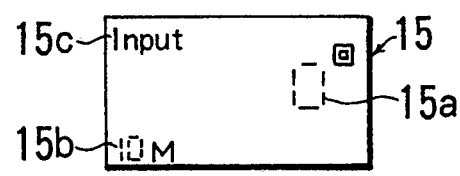
FIG. 13 is an explanatory view to show the indication at the indication unit when the data input is started.

Pressing of the mode switch 17 under these circumstances (Step S19), the microcomputer 25 enters the data input mode. Here, the indicating unit 15 has the indicator 15a indicate "0" as the initial value for the number of spool revolutions as shown in FIG. 13, the indicator 15b indicate "10 m" as the specified length stored in ROM 29 in advance, and the indicator 15c indicate the mode "input".

Figure 14:
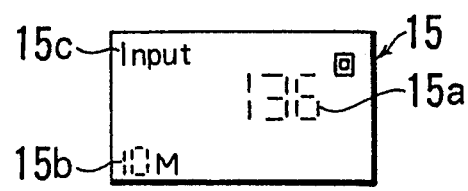
FIG. 14 is an explanatory view to show the indication at the indication unit when the fishing line has been wound up for the specified length.
Figure 15:
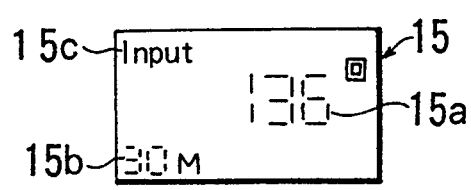
FIG. 15 is an explanatory view to show the indication at the indication unit when the actual number of spool revolutions up to the specified length is input.

Next, when the fishing line 11 is wound up from the reference point D for the specified length of 10 meters with checking the color (Step S20), the spool 9 makes revolutions causing the sensor 39 to generate a pulse signal for every revolution of the spool 9. The up/down counter 41 fetches such pulse signals and subsequently counts the number of revolutions by the spool 9 (Step S21). Then, the actual number of revolutions X3 (X3=136) made by the spool 9 during winding of the fishing line 11 for the specified length of 10 meters is displayed at the indicator 15a as shown in FIG. 14.

Pressing of the set switch 21 in this status (Step S22) causes the count value at the up/down counter 41 (X3=136) to be stored to the RAM 31 as the actual number of revolutions X3 made by the spool 9 during winding up of the line for the specified length of 10 meters (Step S23). Using the actual number of revolutions X3 (X3=136), the following equation can be obtained based on the above formula (2):

$$10=(136)^2(a)+(136)(b) \quad (6)$$

After that, the fishing line 11 is further wound up for 20 meters, which causes the wound up length of the fishing line 11 to be 30 meters from the reference point D (Step S24). As in the first embodiment, when the actual number of revolutions X3 is stored in the RAM 31 upon pressing of the set switch 21, the indicator 15b in the digital indication unit 15 indicates the second specified length "30 m".

Figure 16:
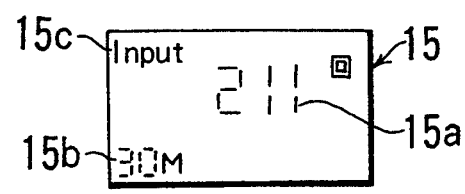
FIG. 16 is an explanatory view to show the indication at the indication unit when the fishing line is wound to the second specified length.

When the fishing line 11 is thus wound up, then a pulse signal for every revolution of the spool 9 is sent to the up/down counter 41 via the input interface 33 and the number of spool revolutions are continuously counted (Step S25). When the fishing line 11 is wound up from the reference point D for the specified length of 30 meters, then the actual number of revolutions X4 (X4=211) made by the spool 9 for the specified length of 30 meters is indicated at the indicator 15a as shown in FIG. 16.

Upon pressing of the set switch 21 (Step S26), the count value (X4=211) at the up/down counter 41 is stored to the RAM 31 as the actual number of revolutions X4 made by the spool 9 for the specified length of 30 meters (Step S27). Using the actual number of revolutions X4 for the above formula (2), the following equation can be obtained:

$$30=(211)^2(a)=(211)(b) \quad (7)$$

The CPU 27 now determines the constants a and b from the above formulae (6) and (7) and by applying the constants a and b to the line length formula (2), completes writing of the constants a and b for the line length formula (2) as the basic data corresponding to the fishing line 11 (Step S29).

The following line length measuring is the same as in the first embodiment as illustrated in the flowchart of FIG. 9.

Thus, the second embodiment can attain the given objects as with the first embodiment, and also eliminates the troublesome process where the fishing line 11 is entirely wound onto the spool 9 in the first embodiment, because the constants a and b can be determined during winding of the fishing line 11 from the bobbin to the spool 9.

Though the specified length of the fishing line 11 is known from subsequent coloring of the line for every 10 meters with taking 50 meters as one cycle for easy letting out and winding up of the fishing line 11 in this embodiment, a metrically graduated gauge can be used.

Figure 17:
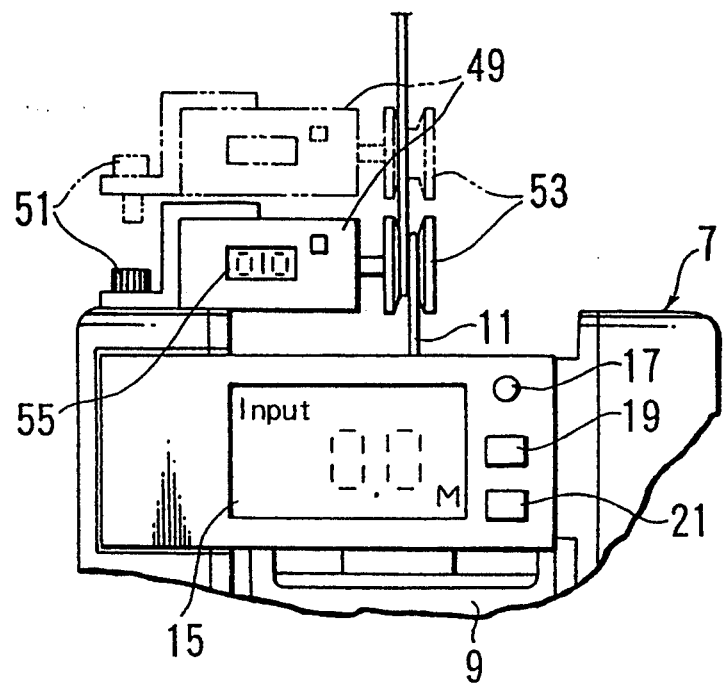
FIG. 17 is a partial plan view of a reel to show a method to determine the specified length by a depth counter.
Figure 18:
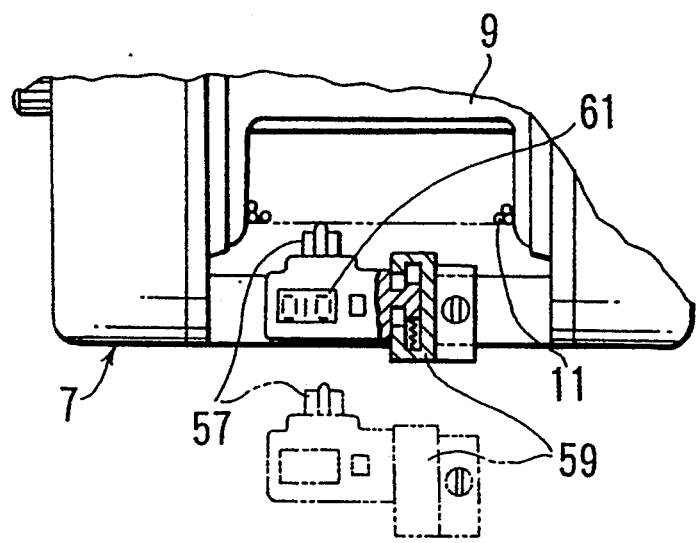
FIG. 18 is a partial plan view of a reel to show another method to determine the specified length by a depth counter.

Alternatively, a known depth counter 49 may be detachably mounted to the reel 7 using screws 51 so that, by winding the fishing line 11 onto a pulley 53 of the depth counter 49 during winding or unwinding of the fishing line 11, the specified length can be obtained as the indication at the counter 55 as in FIG. 17. FIG. 18 shows a known depth counter 59 mounted to the reel 7 with its pressure contact roller 57 making contact with the outer diameter of the wound line. During winding up or unwinding the fishing line 11, the specified length may be determined by placing the pressure contact roller 57 at the depth counter 59 in contact with the outer diameter of the wound line and reading the indication at the counter 61.

In the above embodiment, 10 m and 30 m from the reference points A and D are set as the specified lengths. However, it is naturally understood that the specified lengths are not limited to these values.

In addition, as the detector to detect the number of spool revolutions, a known device to detect the revolutions of a rotating body which makes revolutions in relation to the spool 9.

What is claimed is:

1. A fishing reel having a fishing line length measuring device comprising a reel;
   a spool rotatably supported by said reel whereon the fishing line is wound;
   a sensor for detecting the revolutions of the spool and to output pulse signals;
   an up/down counter for obtaining count values by counting either up or down the pulse signals output from the sensor;

storage means for receiving and holding the count values obtained at said up/down counter when the counter counts actual number of spool revolutions during winding or unwinding the fishing line for a plurality of specified lengths from a reference point set on the fishing line;

an indication unit for indicating a line length determined by operation means; and operation means for determining the line length independent of the thickness and length of the fishing line, said operation means including a first specified line length formula and a second specified line length formula for calculating common constant values in said first and second formulas to thereby obtain said determined line length, each said line length formula corresponding to the numbers of spool revolutions for each specified length and the actual number of revolutions for each specified length.

2. The fishing reel of claim 1, wherein a microcomputer is the line length operation means.

3. The fishing reel of claim 2, wherein the microcomputer comprises a CPU which controls a program memory, a data memory and input/output devices in communication with the operation means.

4. The fishing reel of claim 3, wherein the microcomputer includes a RAM for storing data as results of operation by the CPU.

5. The fishing reel of claim 2, wherein the microcomputer includes a ROM for storing an operation program and the line length formulas.

6. The fishing reel of claim 1, wherein the first specified line length formula is of the formula:

$$Y = aX^2 + bX$$

wherein
Y is the first specified line length;
X is the number of revolutions;
a and b are said constant values for the fishing line.

7. The fishing reel of claim 6, wherein the second specified line length formula is of the formula:

$$Y = aX^2 + bX$$

wherein
Y is the second specified line length;
X is the number of revolutions;
a and b are said constant values for the fishing line.

* * * * *